(12) United States Patent
Lee et al.

(10) Patent No.: US 6,437,970 B1
(45) Date of Patent: Aug. 20, 2002

(54) CAPACITOR COMPRISING A BCZT DIELECTRIC

(75) Inventors: Wen-Hsi Lee, Kaohsiung (TW); Detlev Hennings; Herbert Schreinemacher, both of Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/869,387

(22) PCT Filed: Aug. 18, 2000

(86) PCT No.: PCT/EP00/08171
§ 371 (c)(1),
(2), (4) Date: Oct. 5, 2001

(87) PCT Pub. No.: WO01/33587
PCT Pub. Date: May 10, 2001

(30) Foreign Application Priority Data

Oct. 29, 1999 (DE) .......................................... 199 52 134

(51) Int. Cl.$^7$ ................................................. H01G 4/06
(52) U.S. Cl. ................. 361/311; 361/321.1; 361/321.5; 361/306.3; 501/134; 501/139
(58) Field of Search ................................ 361/311, 321.2, 361/321.5, 312, 321.1, 321.3, 321.4, 313, 306.3; 501/134, 139

(56) References Cited

U.S. PATENT DOCUMENTS

| | | | | |
|---|---|---|---|---|
| 5,790,367 A | * | 8/1998 | Mateika et al. | 361/321.4 |
| 5,889,647 A | * | 3/1999 | Hansen et al. | 361/311 |
| 6,043,974 A | * | 3/2000 | Chen et al. | 361/311 |
| 6,072,688 A | * | 6/2000 | Hennings et al. | 361/311 |
| 6,078,494 A | * | 6/2000 | Hansen | 361/321.5 |
| 6,195,250 B1 | * | 2/2001 | Matoba et al. | 361/321.5 |
| 6,243,254 B1 | * | 6/2001 | Wada et al. | 361/311 |
| 6,310,761 B1 | * | 10/2001 | Hori et al. | 361/321.2 |

* cited by examiner

Primary Examiner—Dean A. Reichard
Assistant Examiner—Nguyen Ha

(57) ABSTRACT

A capacitor having a ceramic dielectric and at least two electrodes, in which the dielectric is essentially a dielectric ceramic composition of a barium-calcium-manganese-zirconium-titanate having the general formula $(Ba_{1-x}Ca_x)_yO_3$ with $0<a\leq0.25$, $0<b\leq0.015$, $0.001\leq c\leq0.01$, $0.005\leq d\leq0.02$, $0<x\leq0.20$, $1.001\leq y\leq1.014$, $0.0005\leq z\leq0.03$ and is characterized by a high capacitance, small dimensions and a long lifetime.

7 Claims, 1 Drawing Sheet

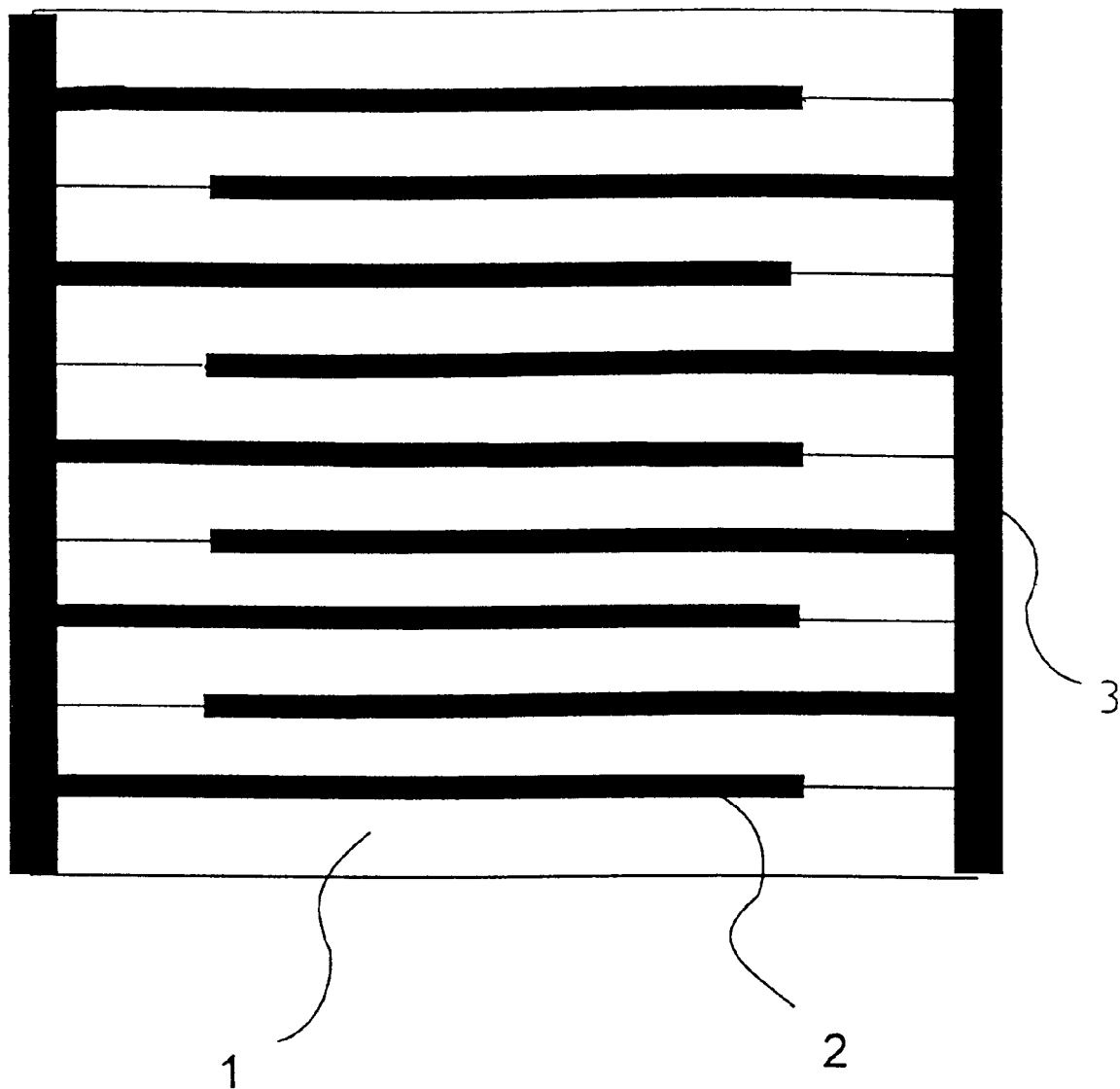

CAPACITOR COMPRISING A BCZT DIELECTRIC

BACKGROUND OF THE INVENTION

The invention relates to a capacitor, particularly a multi-layer capacitor with inner electrodes of a base metal and with a ceramic dielectric which essentially comprises a dielectric composition of a barium-calcium-manganese-zirconium-titanate as a basic material.

Multi-layer capacitors are used, inter alia, for decoupling and buffering the power supply of processors, particularly high-power microprocessors. During operation in the high-power mode, these active electronic components generate much heat, and even with an intensive cooling the temperature of a high-power processor in permanent operation is between 70° C. and 80° C. Conventional multi-layer capacitors of the specification Y5V have only 20% of their rating ($\Delta C \approx 80\%$) at an operating temperature of 80° C. For manufacturing microprocessors, capacitors of the specification X7R are therefore preferably used, because they still have 85% of their rating ($\Delta C < \pm 15\%$) at a temperature of 125° C. The specific capacitance of an X7R capacitor is, however, approximately 5 times lower at room temperature than that of a capacitor of the specification Y5V, so that an X7R capacitor must have larger dimensions, for example, the dimensions of a 1 $\mu$F X7R capacitor must be at least of the size 1206 (length 0.12 nominal, width 0.06 nominal). For capacitances of >5 $\mu$F, the more expensive tantalum capacitors can therefore only be used until now.

A ceramic multi-layer capacitor having a plurality of ceramic layers on the basis of doped $BaTiO_3$ and a plurality of electrode layers mainly comprising nickel is already known from WO 98/54737, in which capacitor the ceramic layers and the electrode layers are alternately stacked so that they constitute a multi-layer structure and are implemented on both side faces with electric connections contacting the electrode layers, and in which the main components of the doped $BaTiO_3$ are defined by the general formula $(Ba_{1-a-b}Ca_aDy_b)(Ti_{1-c-d-e-f}Zr_cMn_dNb_e)_fO_{3+\partial}$. This capacitor is suitable for DC applications at high temperatures.

SUMMARY OF THE INVENTION

It is an object of the present invention to provide a capacitor having a ceramic dielectric and at least two electrodes, in which the dielectric essentially comprises a dielectric ceramic composition of a barium-calcium-manganese-zirconium-titanate as a basic material, which capacitor is suitable for DC applications at high temperatures and has smaller dimensions than the prior-art capacitor.

According to the invention, the object is solved by a capacitor having a ceramic dielectric and at least two electrodes, in which the dielectric essentially comprises a dielectric ceramic composition of a barium-calcium-manganese-zirconium-titanate as a basic material having the composition $(Ba_{1-x}Ca_x)_y[Ti_{1-a-b-c-d}Zr_aMn_bNb_cDy_d]O_3$ with $0 < a \leq 0.25$, $0 < b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

Within the scope of the present invention, it is preferred that the general formula is $(Ba_{1-x}Ca_x)_y[Ti_{1-a-b-c-d}Zr_aMn_bNb_cDy_d]O_3$ with $0 < a \leq 0.25$, $c-0.5d \leq b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

It is also preferred that the dielectric ceramic composition comprises, as a further additive, $SiO2$ in a quantity z with $0.0005 \leq z \leq 0.03$ mol/unit.

Furthermore, it is preferred that the electrodes consist of nickel or a nickel-containing alloy.

The invention also relates to a dielectric ceramic composition of a barium-calcium-manganese-zirconium-titanate as a basic material having the general formula $(Ba_{1-x}Ca_x)_y[Ti_{1-a-b-c-d}Zr_aMn_bNb_cDy_d]O_3$ with $0 < a \leq 0.25$, $0 < b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

It is preferred that the general formula is $(Ba_{1-x}Ca_x)_y[Ti_{1-a-b-c-d}Zr_aMn_bNb_cDy_d]O_3$ with $0 < a \leq 0.25$, $c-0.5d \leq b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

It is also preferred that the composition comprises, as a further additive, $SiO2$ in a quantity z with $0.0005 \leq z \leq 0.03$ mol/unit.

Such a dielectric ceramic composition is characterized by a low sintering temperature of 1200° C. Due to its fine grain structure it is suitable for very thin dielectric layers. Capacitors with a dielectric comprising this material have an extraordinarily high breakdown voltage <100 V/$\mu$m and are resistant to aging when they are DC operated. With this dielectric ceramic composition, capacitors having a high capacitance and small dimensions can be manufactured, while they simultaneously have a long lifetime.

Within the scope of the present invention it is preferable that the electrodes comprise nickel or a nickel-containing alloy.

These and other aspects of the invention are apparent from and will be elucidated with reference to the embodiments described hereinafter.

BRIEF DESCRIPTION OF THE DRAWING

In the drawing:

FIG. 1 is a cross-sectional view of an embodiment of the capacitor according to the invention. In this preferred embodiment, the capacitor according to the invention is a multi-layer capacitor.

DETAILED DESCRIPTION OF THE INVENTION

The invention will be described in greater detail with reference to the figure of the drawing and the examples the follow.

The ceramic multi-layer capacitor according to the invention comprises a ceramic dielectric 1 consisting of a multitude of oxidic dielectric layers having a thickness of not more than 5 $\mu$m, and a multitude of inner electrodes 2 which are arranged one over the other in the form of layers in the dielectric and alternately extend to two facing end faces of the dielectric. Metallic contact electrodes 3 are provided as outer terminals on the end faces of the ceramic dielectric, which terminals are connected to the corresponding inner metallic electrodes.

The manufacture is realized in accordance with the conventional manufacturing techniques for ceramic capacitors, in which numerous manufacturing variants are possible, dependent on the desired shape and dimensions, the envisaged accuracy and the field of application.

Preferred material for the ceramic dielectric is a dielectric ceramic preparation of a barium-calcium-manganese-zirconium-titanate as a basic material having the general $(Ba_{1-x}Ca_x)_y[Ti_{1-a-b-c-d}Zr_aMn_bNb_cDy_d]O_3$ with $0 < a \leq 0.25$, $c-0.5d \leq b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$ and comprises, as a further additive, $SiO_2$ in a quantity z with $0.0005 \leq z \leq 0.03$ mol/unit.

The material selection for the electrodes is not subjected to particular limitations so that a metal or a combination of two or more conventionally used metals may be used. The electrodes may consist of rare metals such as platinum, palladium, gold or silver. They may also comprise chromium, zirconium, vanadium, zinc, copper, tin, lead, manganese, molybdenum, tungsten, titanium or aluminum. They preferably comprise a base metal selected from the group of nickel, iron, cobalt, and their alloys.

The dielectric ceramic composition may be manufactured in accordance with the conventional methods for powder manufacture, for example, by means of the mixing oxide method, co-precipitation, spray drying, sol/gel method, hydrothermal method or alkoxide method. The mixing oxide method is preferred, in which the output oxide or thermally decomposable compounds such as, for example, carbonates, hydroxides, oxalates or acetates are mixed and ground. Subsequently, the basic powder is calcinated at 1000° C. to 1400° C.

For green body shaping, all conventional methods may also be used. For ceramic capacitors in the multi-layer technology, a suspension is first made from the calcinated powder for the purpose of shaping, which suspension comprises the powder and further components such as solvents, binding agents and possibly softeners and dispersing agents. The solvent may be, for example, water, an alcohol, toluol, xylol or trichloroethylene. Binders are the conventional organic polymers such as polyvinylalcohol, polyvinylbutyral or polymethylmethacrylate. Softeners may be, for example, glycerin, polyglycol or phthalates. Furthermore, dispersing agents, such as alkylarylpolyetheralcohols, polyethyleneglycolethylethers or octylphenoxyethanol, may be added to the suspension. Furthermore, dispersing agents, such as alkylarylpolyetheralcohols, polyethyleneglycolethylethers or octylphenoxyethanol, may be added to the suspension.

In accordance with the preferred method, green ceramic foils are manufactured from the suspension by means of a foil molding method. In the foil molding method, the suspension is molded on a moving carrier surface. After evaporation of the solvent, a more or less flexible foil remains, dependent on the binding system, which foil is cut, printed with a metal paste in the pattern of the inner electrodes in a silk-screening method, and laminated. The individual multi-layer capacitors are cut from the laminate. They are initially sintered in a weakly reducing atmosphere at temperatures between 1100° C. and 1400° C. and subsequently tempered in a weakly oxidizing atmosphere at temperatures between 600° C. and 1100° C. Suitable as a weakly reducing atmosphere is nitrogen saturated with water vapor, with an admixture of 0.5 to 2% by volume of hydrogen, while nitrogen with 5 ppm to 100 ppm of oxygen may be used as a weakly oxidizing atmosphere.

For forming the outer electrodes, a metal paste comprising, for example, nickel is provided and burned in on the end faces of the capacitors. The outer electrodes may, however, also be provided by way of vapor deposition of a metal layer of, for example, gold.

To characterize the capacitors according to the invention, the capacitance C is measured at 25° C. and the loss factor tan∂ is measured in known manner. The lifetime is measured in an accelerated lifetime test (ALT) at 105° C. and 27 V/μm. To this end, test pellets having a diameter of 5 mm and a layer thickness of 0.05 mm, contacted with electrodes of CrNi and Au (50 nm) are manufactured, heated at 105° C. and a voltage of 27 V/μm is applied. The current is measured, from which the insulating resistance is computed. After the start of the test, the insulating resistance is initially high. Furthermore, the insulating resistance essentially remains constant at the high level. Only after a given characteristic degradation period will the insulation resistance decrease. The leakage current increases by several magnitudes within a period which is short with respect to the current measuring period. The lifetime is defined as the period in which the leakage current has risen by a decimal power.

Embodiment 1

For manufacturing multi-layer capacitors, a slurry was prepared first. To this end, ultrapure BaCO3, TiO2, CaCO3, ZrO2, MnO2, Nb2O5, Dy2O3 and SiO2 defined by the formula (Ba1-xCax) y O3 with z SiO2 in accordance with the values given in Table 1 were weighed together, wet ground in a polypropylene flask, dried and calcinated at 1000° C. for 4 hours in a corundum crucible.

TABLE 1

|    | a   | b     | c     | d     | x    | Y     | z     |
|----|-----|-------|-------|-------|------|-------|-------|
| 14 | 0.2 | 0.001 | 0.006 | 0.01  | 0.04 | 1.009 | 0.015 |
| 15 | 0.2 | 0.001 | 0.006 | 0.003 | 0.04 | 1.009 | 0.015 |
| 16 | 0.2 | 0.001 | 0.001 | 0.01  | 0.04 | 1.009 | 0.015 |
| 17 | 0.2 | 0.001 | 0.006 | 0.022 | 0.04 | 1.009 | 0.015 |
| 18 | 0.2 | 0.001 | 0.006 | 0.01  | 0.04 | 1.016 | 0.015 |
| 19 | 0.2 | 0.001 | 0.006 | 0.01  | 0.04 | 1.003 | 0.015 |
| 20 | 0.2 | 0.001 | 0.006 | 0.01  | 0.04 | 1.009 | 0.005 |
| 21 | 0.2 | 0.001 | 0.006 | 0.01  | 0.04 | 1.009 | 0.03  |

Subsequently, the powder was ground to an average grain size of 0.5 μm. Then the powder was stirred with a solvent, a dispersing agent and a binder to form a slurry.

This slurry was molded on a carrier foil in accordance with the doctor blade method. The green ceramic foil thus formed was dried, cut and printed with nickel paste for the electrode layers. The printed foil was stacked and pressed to form green plates which were then cut and subsequently sintered for 4 hours at 1200° C. in a reducing, hydrogen-containing, humid atmosphere with an oxygen partial pressure of $p_{O2}=1.183 \times 10^{-10}$ Pa. For purpose of contacting, the side faces of the capacitors were covered with silver paste. The measurement of the dielectric properties yielded values as stated in Table 2.

TABLE 2

|    | C (μF) 25° C. | tan∂ % | I.R. MΩ       | B.V. V/μm | Life 27 V/μm |
|----|---------------|--------|---------------|-----------|--------------|
| 14 | 23.5          | 7      | $2 \times 10^3$ | 110       | 50           |
| 15 | 24.6          | 8      | $1 \times 10^3$ | 20        | 12           |
| 16 | 24.1          | 8.4    | $8 \times 10^3$ | 50        | 5            |
| 17 | 17.6          | 5.6    | $5 \times 10^3$ | 115       | 50           |
| 18 | 16.5          | 4.3    | $5 \times 10^3$ | 130       | 50           |
| 19 | 25.6          | 10.1   | $1 \times 10^3$ | 70        | 38           |
| 20 | 22.5          | 8.6    | $2 \times 10^3$ | 100       | 50           |
| 21 | 26.5          | 9.2    | $2 \times 10^3$ | 43        | 7            |

Embodiment 2

For measuring the dielectric properties, ceramic pellets with compositions as defined in Table 3 were also made.

TABLE 3

|    | a   | b     | c     | d     | x     | y     | z     |
|----|-----|-------|-------|-------|-------|-------|-------|
| 1  | 0.2 | 0.01  | 0.006 | 0.01  | 0.04  | 1.01  | 0     |
| 2  | 0.2 | 0.01  | 0.006 | 0.01  | 0.04  | 1.01  | 0.03  |
| 3  | 0.2 | 0.01  | 0.012 | 0.01  | 0.04  | 1.009 | 0.015 |
| 4  | 0.2 | 0.01  | 0.001 | 0.01  | 0.04  | 1.009 | 0.015 |
| 5  | 0.2 | 0.01  | 0.006 | 0.01  | 0.04  | 1.0   | 0.015 |
| 6  | 0.2 | 0.01  | 0.006 | 0.01  | 0.04  | 1.016 | 0.015 |
| 7  | 0.2 | 0.01  | 0.006 | 0.022 | 0.04  | 1.09  | 0.015 |
| 8  | 0.2 | 0.01  | 0.006 | 0.003 | 0.04  | 1.009 | 0.015 |
| 9  | 0.2 | 0.016 | 0.006 | 0.01  | 0.04  | 1.009 | 0.015 |
| 10 | 0.2 | 0.002 | 0.006 | 0.01  | 0.04  | 1.009 | 0.015 |
| 11 | 0.1 | 0.01  | 0.006 | 0.01  | 0.04  | 1.009 | 0.015 |
| 12 | 0.2 | 0.01  | 0.006 | 0.01  | 0.013 | 1.009 | 0.015 |
| 13 | 0.2 | 0.01  | 0.006 | 0.01  | 0.04  | 1.009 | 0.015 |

To this end the calcinated powder was pressed to discs having a diameter of 7 mm and sintered under the conditions of embodiment 1. The result of the tests of the dielectric ties are stated in Table 4.

TABLE 4

|    | K 25° C. | tan∂ % | I.R. MΩ | Density g/cm$^3$ | G.S. μm |
|----|----------|--------|---------|-------------------|---------|
| 1  | 4500     | 0.4    | 1 × 10$^3$ | 5.56  | 1   |
| 2  | 11000    | 1.5    | 1 × 10$^3$ | 5.91  | 5   |
| 3  | 12000    | 3.5    | 1 × 10$^3$ | 5.92  | 3   |
| 4  | 10000    | 1.0    | 1 × 10$^3$ | 5.90  | 3   |
| 5  | 4000     | 0.3    | 1 × 10$^3$ | 5.5   | 1   |
| 6  | 7500     | 0.4    | 2 × 10$^3$ | 5.90  | 1.5 |
| 7  | 6300     | 0.5    | 3 × 10$^3$ | 5.91  | 1.5 |
| 8  | 11000    | 1.0    | 4 × 10$^3$ | 5.91  | 3   |
| 9  | 5700     | 0.4    | 5 × 10$^3$ | 5.92  | 1.5 |
| 10 | 14500    | 1.1    | 1 × 10$^3$ | 5.91  | 5   |
| 11 | 10300    | 2.1    | 2 × 10$^3$ | 5.90  | 1.5 |
| 12 | 7600     | 0.7    | 3 × 10$^3$ | 5.83  | 2.5 |
| 13 | 10500    | 0.7    | 5 × 10$^3$ | 5.92  | 2   |

What is claimed is:

1. A capacitor having a ceramic dielectric and at least two electrodes, in which the dielectric essentially comprises a dielectric ceramic composition of a barium-calcium-manganese-zirconium-titanate as a basic material having the general formula $(Ba_{1-x}Ca_x)_y[Ti_{1-a-b-c-d}Zr_aMn_bNb_cDy_d]O_3$ with $0 < a \leq 0.25$, $0 < b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

2. A capacitor as claimed in claim 1, wherein the composition is $(Ba_{1-x}Ca_x)_yO_3$ with $0 < a \leq 0.25$, $c - 0.5d \leq b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

3. A capacitor as claimed in claim 1, wherein the dielectric ceramic preparation comprises an additive of $SiO_2$ in a quantity z with $0.0005 \leq z \leq 0.03$ mol/unit.

4. A capacitor as claimed in claim 1, wherein the electrodes consist of nickel or a nickel-containing alloy.

5. A dielectric ceramic preparation of a barium-calcium-manganese-zirconium-titanate as a basic material having the general formula $(Ba_{1-x}Ca_x)_y[Ti_{1-a-b-c-d}Zr_aMn_bNb_cDy_d]O_3$ with $0 < a \leq 0.25$, $0 < b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

6. A dielectric ceramic composition as claimed in claim 5, wherein the general formula is $(Ba_{1-x}Ca_x)_yO_3$ with $0 < a \leq 0.25$, $c - 0.5d \leq b \leq 0.015$, $0.001 \leq c \leq 0.01$, $0.005 \leq d \leq 0.02$, $0 < x \leq 0.20$, $1.001 \leq y \leq 1.014$, $0.0005 \leq z \leq 0.03$.

7. A dielectric ceramic preparation as claimed in claim 5, wherein it comprises, an additive of $SiO_2$ in a quantity z with $0.0005 \leq z \leq 0.03$ mol/unit.

* * * * *